United States Patent
Huang et al.

(10) Patent No.: US 9,501,998 B2
(45) Date of Patent: Nov. 22, 2016

(54) DISPLAY CIRCUIT OF SWITCHABLE EXTERNAL DISPLAY PORTS

(71) Applicant: Giga-Byte Technology Co., Ltd., New Taipei (TW)

(72) Inventors: Shun Chih Huang, New Taipei (TW); Yin Yu Lin, New Taipei (TW); Chih-Lung Chang, New Taipei (TW)

(73) Assignee: GIGA-BYTE TECHNOLOGY CO., LTD., New Taipei (TW)

(*) Notice: Subject to any disclaimer, the term of this patent is extended or adjusted under 35 U.S.C. 154(b) by 65 days.

(21) Appl. No.: 14/556,302

(22) Filed: Dec. 1, 2014

(65) Prior Publication Data

US 2016/0118017 A1    Apr. 28, 2016

(30) Foreign Application Priority Data

Oct. 22, 2014  (TW) .............. 103136447 A

(51) Int. Cl.
*G06F 13/14* (2006.01)
*G09G 5/00* (2006.01)
*G06F 3/14* (2006.01)
*G06F 9/44* (2006.01)
*G06F 9/445* (2006.01)
*G09G 5/36* (2006.01)
*G06F 13/40* (2006.01)

(52) U.S. Cl.
CPC .............. *G09G 5/005* (2013.01); *G06F 3/1431* (2013.01); *G06F 3/1438* (2013.01); *G06F 9/44* (2013.01); *G06F 9/4403* (2013.01); *G06F 9/4406* (2013.01); *G06F 9/44505* (2013.01); *G06F 13/4022* (2013.01); *G09G 5/363* (2013.01); *G09G 2360/02* (2013.01); *G09G 2370/12* (2013.01); *G09G 2370/24* (2013.01)

(58) Field of Classification Search
CPC .... G09G 5/363; G09G 5/006; G09G 9/4401; G09G 9/4411
See application file for complete search history.

(56) References Cited

U.S. PATENT DOCUMENTS

| | | | |
|---|---|---|---|
| 8,205,069 B2 * | 6/2012 | Wu | G06F 11/1456 713/2 |
| 2010/0253691 A1 * | 10/2010 | Lin | G06F 3/1431 345/520 |
| 2015/0205616 A1 * | 7/2015 | Thai | G06F 9/463 345/542 |

* cited by examiner

*Primary Examiner* — Hau Nguyen
(74) *Attorney, Agent, or Firm* — Maschoff Brennan

(57) ABSTRACT

A display circuit includes a graphics display unit for generating a graphics display signal; a first BIOS and a second BIOS electrically connected to the graphics display unit, and respectively storing a first BIOS program code and a second BIOS program code; a BIOS switch electrically for enabling one of the first BIOS and the second BIOS and disabling the other; an output switch electrically connected to the graphics display unit; a first output port and a second output port electrically connected to the output switch. When the graphics display unit loads the first BIOS program code, the output switch is switched to electrically connect the first output port to the graphics display unit; when the graphics display unit loads the second BIOS program code, the output switch is switched to electrically connect the second output port to the graphics display unit.

8 Claims, 11 Drawing Sheets

DISPLAY CIRCUIT OF SWITCHABLE EXTERNAL DISPLAY PORTS

CROSS REFERENCE TO RELATED APPLICATION

This application claims the benefit of the filing date of Taiwan Patent Application No. 103136447, filed on, Oct. 22, 2014, in the Taiwan Intellectual Property Office, R.O.C., the disclosure of which is incorporated herein in its entirety by reference.

BACKGROUND

Technical Field

This disclosure relates to output of a graphics circuit, in particular, to a display circuit of switchable external display ports.

Related Art

With the applications of the multimedia, including the videos playing, computer games carried out, by using extensively the computers to perform, the demands for those users about the display ports of the computers has also become increasingly diverse. General display cards or built-in display circuits of the computers only provide limited external display ports of fixed specifications for applications. For example, the external display ports of those general laptops usually include only one HDMI connector and a VGA connector; and the existing high-end display cards are also only equipped with two external display ports with the combinations of fixed specifications (two HDMI or one DVI plus one DVI).

The aforementioned limitations of the quantity primarily come from the Basic Input/Output System of the graphics display chip (GPU BIOS). GPU BIOS limits the quantity and specifications of the I/O. Under these limitations, the manufacturers cannot arbitrarily increase the number of the external display ports, and cannot arbitrarily change the specifications of the external display ports, either. They can only change the specifications by rewriting the GPU BIOS program code, but the quantity of ports is still limited (the quantity is simultaneously limited by the number of the pins of the I/O of the GPU).

SUMMARY

In view of the foregoing problems, this disclosure provides a display circuit of switchable external display ports, which can change the loaded BIOS program code by the graphics display chips to change the corresponding output ports.

This disclosure provides a display circuit of switchable external display ports, including a graphics display chip for generating a graphics display signal; a first BIOS, electrically connected to the graphics display chip and storing a first BIOS program code; a second BIOS, electrically connected to the graphics display chip and storing a second BIOS program code; a BIOS switch electrically connected to the first BIOS and the second BIOS, for enabling one of the first BIOS and the second BIOS and disabling the other, such that the graphics display chip only loads one of the first BIOS program code and the second BIOS program code; an output switch, electrically connected to the graphics display chip; a first output port electrically connected the output switch; and a second output port electrically connected the output switch.

When the graphics display chip loads the first BIOS program code, the graphics display chip generates the graphics display signal conforming to the first output port, and the output switch is switched to electrically connect the first output port to the graphics display chip to receive the graphics display signal conforming to the first output port; when the graphics display chip loads the second BIOS program code, the graphics display chip generates the graphics display signal conforming to the second output port and the output switch is switched to electrically connect the second output port to the graphics display chip to receive the graphics display signal conforming to the second output port.

In one or more embodiment, the first output port and the second output port are the display signal output ports of different specifications.

In one or more embodiment, the BIOS switch and the output switch are switched manually.

In one or more embodiment, the first output port may include a detection pin, electrically connected to the BIOS switch and the output switch to determine whether the first output port is connected to an external monitor or not, wherein when the first output port connects to the external monitor, the detection pin outputs the first switching signal to the BIOS switch and the output switch, the BIOS switch is switched to enable the first BIOS and simultaneously the output switch is switched to electrically connect the first output port to the graphics display chip; when the second output port connects to the external monitor, the detection pin outputs the second switching signal to the BIOS switch and the output switch, the BIOS switch is switched to enable the second BIOS and simultaneously the output switch is switched to electrically connect the second output port to the graphics display chip.

This disclosure also provides an alternative display circuit of switchable external display port, including a graphics display chip storing a first BIOS program code and a second BIOS program code, and loading either the first BIOS program code or the second BIOS program code to generate a graphics display signal; an output switch, electrically connected to the graphics display chip; a first output port, electrically connected to the output switch; and a second output port, electrically connected to the output switch.

When the graphics display chip loads the first BIOS program code, the graphics display chip generates the graphics display signal conforming to the first output port, and the output switch is switched to electrically connect the first output port to the graphics display chip to receive the graphics display signal conforming to the first output port; when the graphics display chip loads the second BIOS program code, the graphics display chip generates the graphics display signal conforming to the second output port, and the output switch is switched to electrically connect the second output port to the graphics display chip to receive the graphics display signal conforming to the second output port.

In one or more embodiment, the first output port and the second output port are the display signal output port of different specifications.

In one or more embodiment, the output switch is switched manually.

In one or more embodiment, the first output port may include a detection pin electrically connected to the output switch to determine whether the first output port connects to an external monitor or not, wherein when the first output port connects to the external monitor, the detection pin outputs the first switching signal to the output switch, and the output switch is switched to electrically connect the first output port to the graphics display chip; when the second output port connects to the external monitor, the detection pin outputs the second switching signal to the output switch, and the output switch is switched to electrically connect the second output port to the graphics display chip.

Through the display circuits of this disclosure, the manufacturers can provide diverse display output ports of a variety of specifications. Through the loaded BIOS switching, a user can enable the display output ports that the users need, not restricted to the limitation of the number of the output ports caused by one single BIOS. At the same time, through the detection pin of the output port, the aforementioned switching can also become the automatic switching.

DETAILED DESCRIPTION

Figure 1:
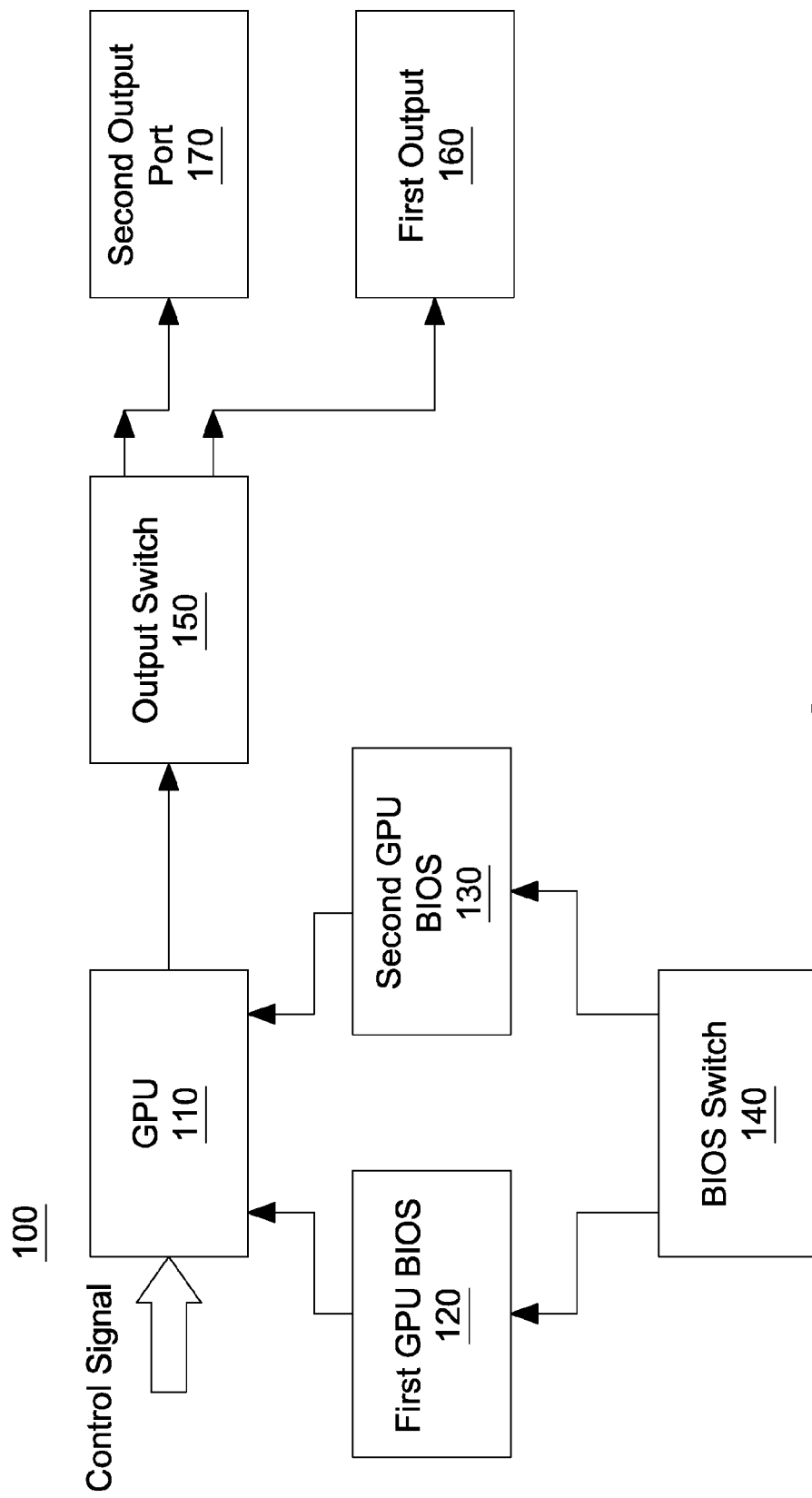
FIG. 1 is a circuit block diagram according to a first embodiment of this disclosure.

Referring to FIG. 1, a first embodiment of this disclosure discloses a display circuit 100 of switchable external display port, applied to the display signal output of a computer. The display circuit 100 is applied to an independent display card or the built-in display architecture of the computer.

As shown in FIG. 1, the display circuit 100 includes a graphics display unit 110 (GPU 110), a first graphics display Basic Input/Output System chip 120 (first BIOS 120), a second graphics display Basic Input/Output System chip 130 (second BIOS 130), a Basic Input/Output System chip switch 140 (BIOS switch 140), an output switch 150, a first output port 160, and a second output port 170.

As shown in FIG. 1, the GPU 110 is used for receiving a control signal from the computer, to generate a graphics display signal.

The first BIOS 120 and the second BIOS 130 are electrically connected to the GPU 110. At the same time, the first BIOS 120 and the second BIOS 130 store a first BIOS program code and a second BIOS program code, respectively.

The GPU 110 loads the first BIOS program code or the second BIOS program code, in order to determine the specifications of the output graphics display signal and the pins for outputting the graphics display signal corresponding to the first output port 160 or the second output port 170.

As described above, when the GPU 110 loads the first BIOS program code, the GPU 110 generates the graphics display signal conforming to the first output port 160. When the GPU 110 loads the second BIOS program code, the GPU 110 generates the graphics display signal conforming to the second output port 170.

As shown in FIG. 1, the BIOS switch 140 is electrically connected to the first BIOS 120 and the second BIOS 130, for enabling one of the first BIOS 120 and the second BIOS 130 and disabling the other, such that the GPU 110 only loads one of the first BIOS program code and the second BIOS program code.

The output switch 150 is electrically connected to the GPU 110. The first output port 160 and the second output port 170 are electrically connected the output switch 150. The output switch 150 is selectively switched to electrically connect one of the first output port 160 and the second output port 170 to the GPU 110.

Figure 2:
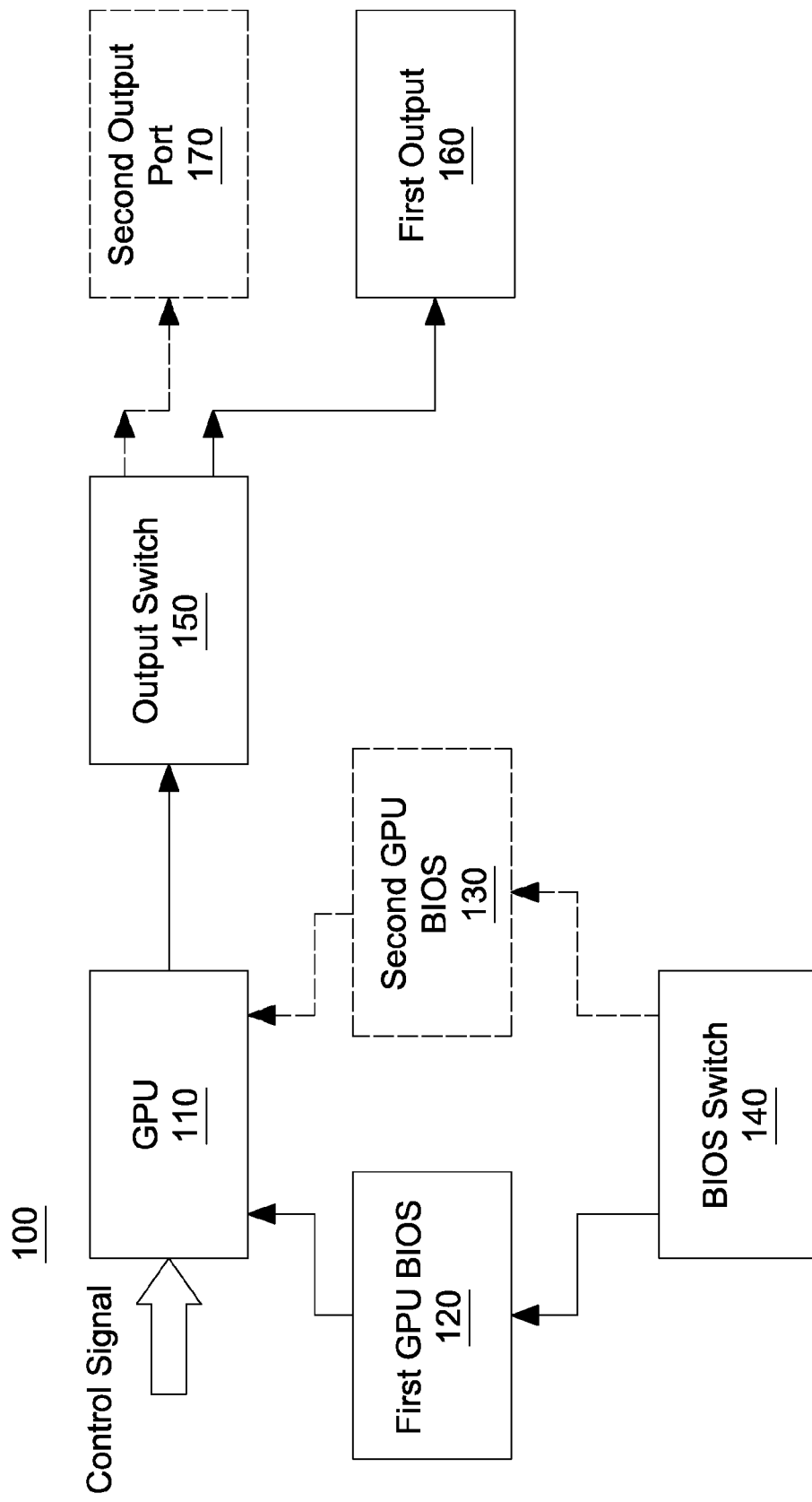
FIG. 2 and FIG. 3 are schematic diagrams according to the first embodiment of this disclosure.

As shown in FIG. 2, when the first BIOS 120 is enabled, the output switch 150 is switched to electrically connect the first output port 160 to the GPU 110 to receive the graphics display signal conforming to the first output port 160.

Figure 3:
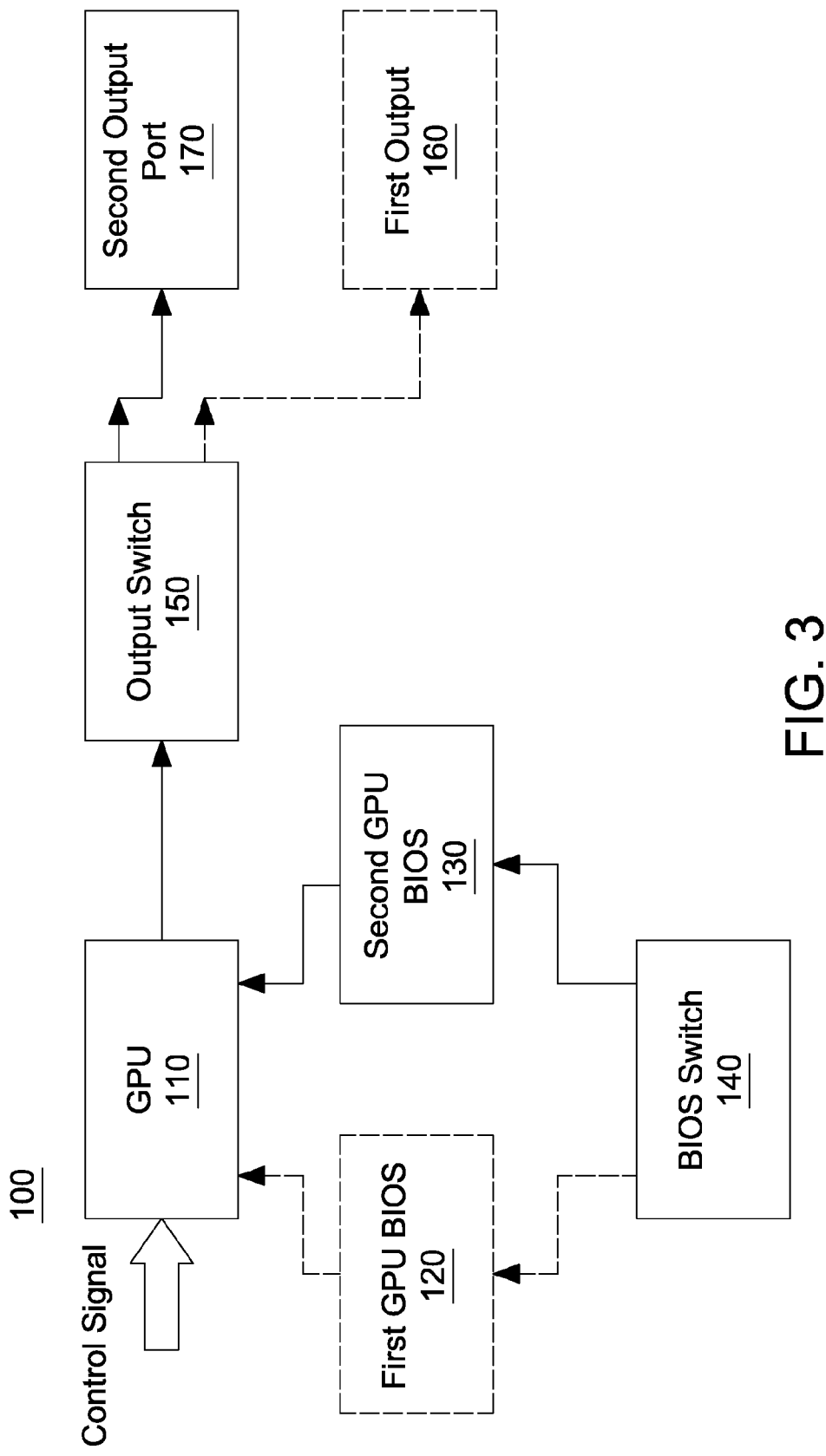

As shown in FIG. 3, when the second BIOS 130 is enabled, the output switch 150 is switched to electrically connect the second output port 170 to the GPU 110, to receive the graphics display signal conforming to the second output port 170.

In the specific implementation aspect, the first output port 160 and the second output port 170 are display signal output ports of different specifications. The combination could be a VGA connector and a DVI connectors, a DVI connector and a HDMI connector, a VGA connector and a HDMI connector. Through the aforementioned dual GPU BIOS architecture, the user chooses according to their desired output port (the first output port 160 or the second output port 170) to enable the corresponding GPU BIOS, and match the output signal with the specifications.

The foregoing BIOS switch 140 and the output switch 150 can be manually switched, but can also be automatically switched based on the connection status of the first output port 160 and the second output port 170.

Figure 4:
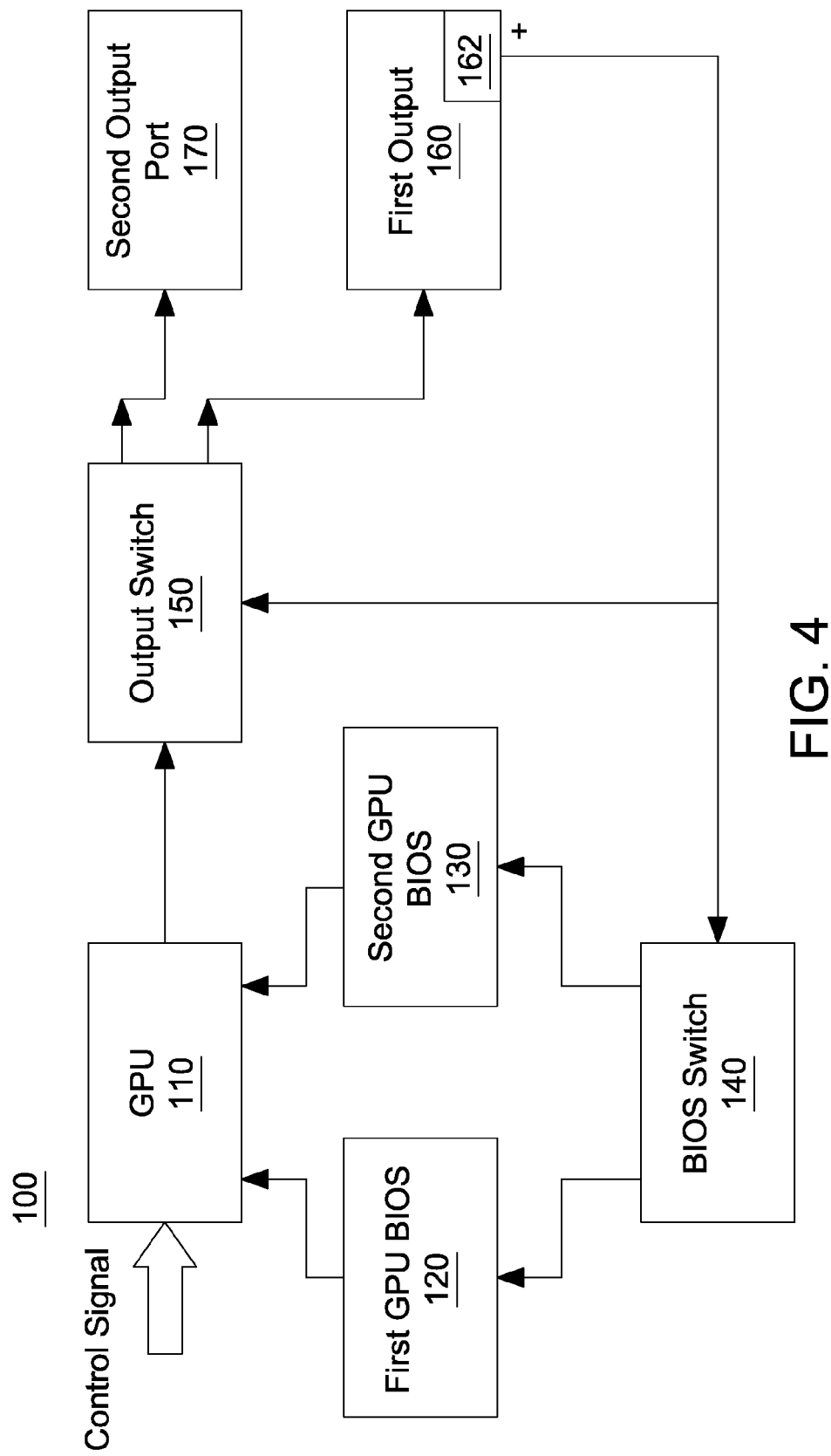
FIG. 4 is a circuit block diagram according to a second embodiment of this disclosure.

FIG. 4 shows a display circuit 100 according to a second embodiment of this disclosure. In the second embodiment, the first output port 160 further includes a detection pin 162 electrically connected to the BIOS switch 140 and the output switch 150, to determine whether the first output port 160 is connected to an external monitor or not. The detection pin 162 can be the HPD signal pin of HDMI.

Figure 5:
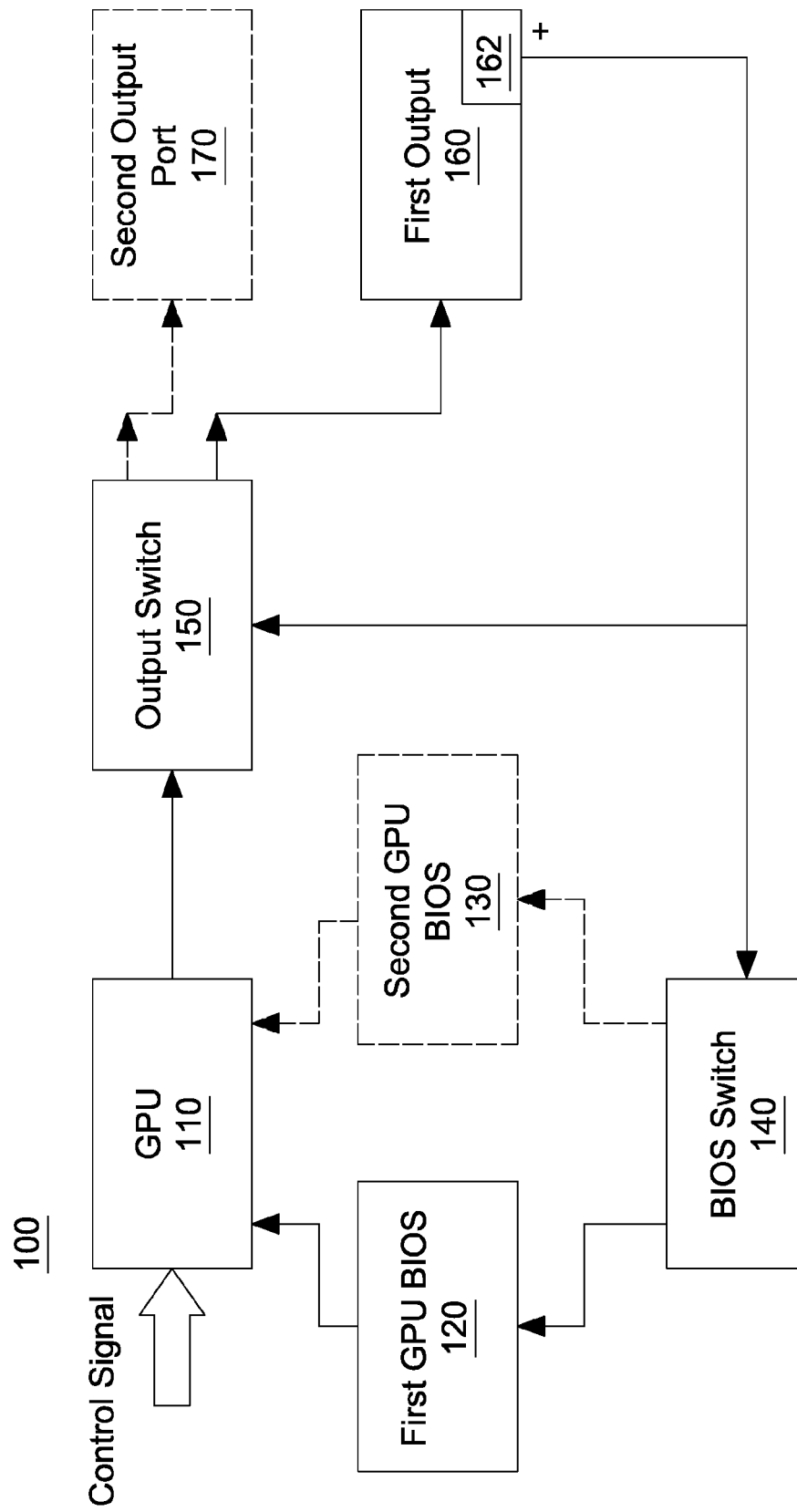
FIG. 5 and FIG. 6 are schematic diagrams of the second embodiment of this disclosure.

As shown in FIG. 5, when the first output port 160 is connected to the external monitor, the logic level of the detection pin 162 is raised to be high level (+). And the provided high level as a first switching signal 51 is output to the BIOS switch 140 and the output switch 150. At this moment, the BIOS switch 140 is switched to enable the first BIOS 120, while the output switch 150 is simultaneously switched to electrically connect the first output port 160 to the GPU 110 to receive the graphics display signal conforming to the first output port 160. At the same time, the second BIOS 130 is disabled, and the connection between the second output port 170 and the GPU 110 is also set up to be cut off.

Figure 6:
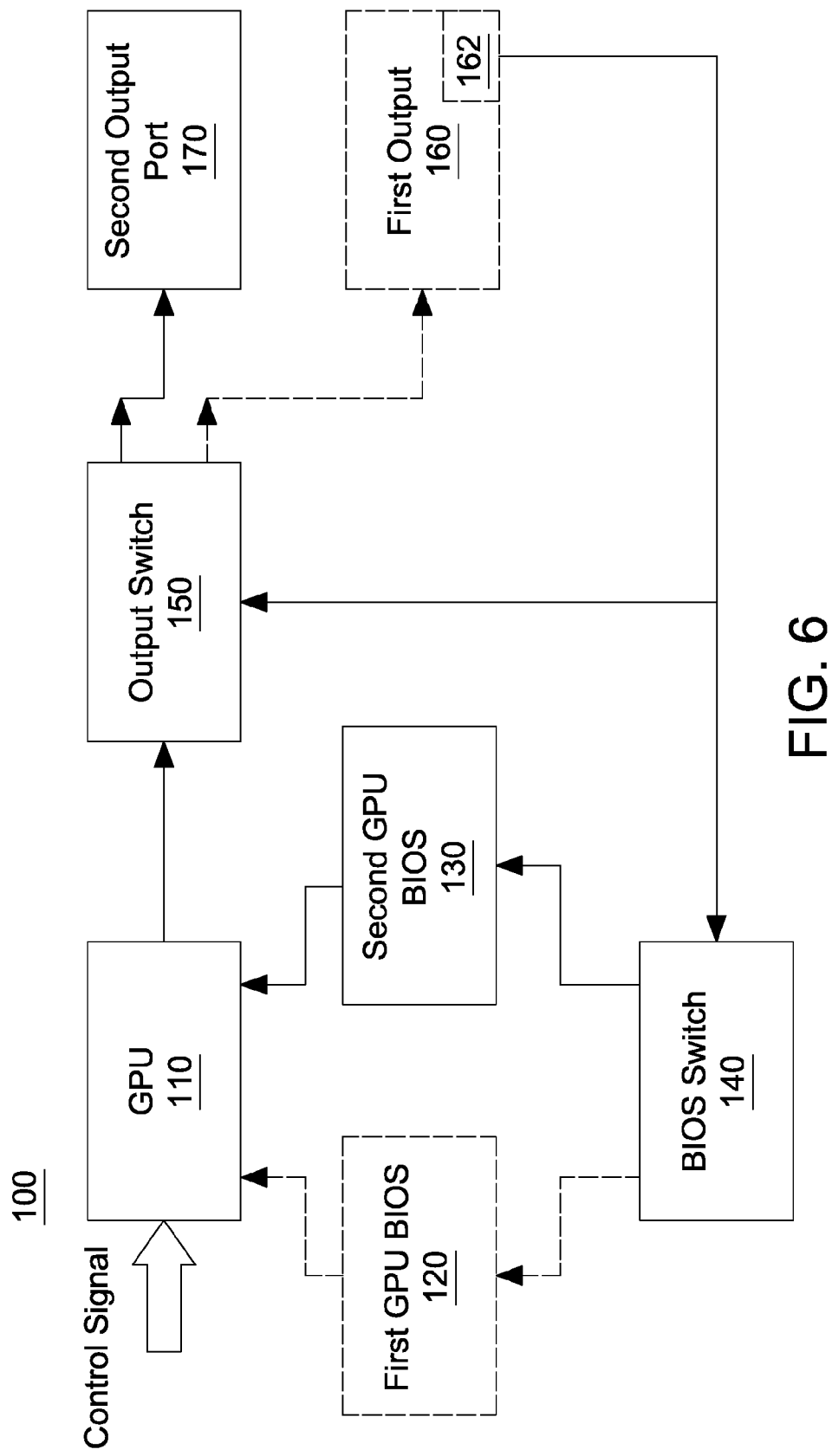

As shown in FIG. 6, when the first output port 160 is not connected to the external monitor, the logic level of the detection pin 162 maintains low level (−). And the provided low level as a second switching signal is output to the BIOS switch 140 and the output switch 150. At this moment, the BIOS switch 140 is switched to enable the second BIOS 130, while the output switch 150 is simultaneously switched to electrically connect the second output port 170 to the GPU 110 to receive the graphics display signal conforming to the second output port 170; at the same time, the first BIOS 120 is disabled, and the connected between the first output port 160 and the GPU 110 is also set up to be cut off.

Figure 7:
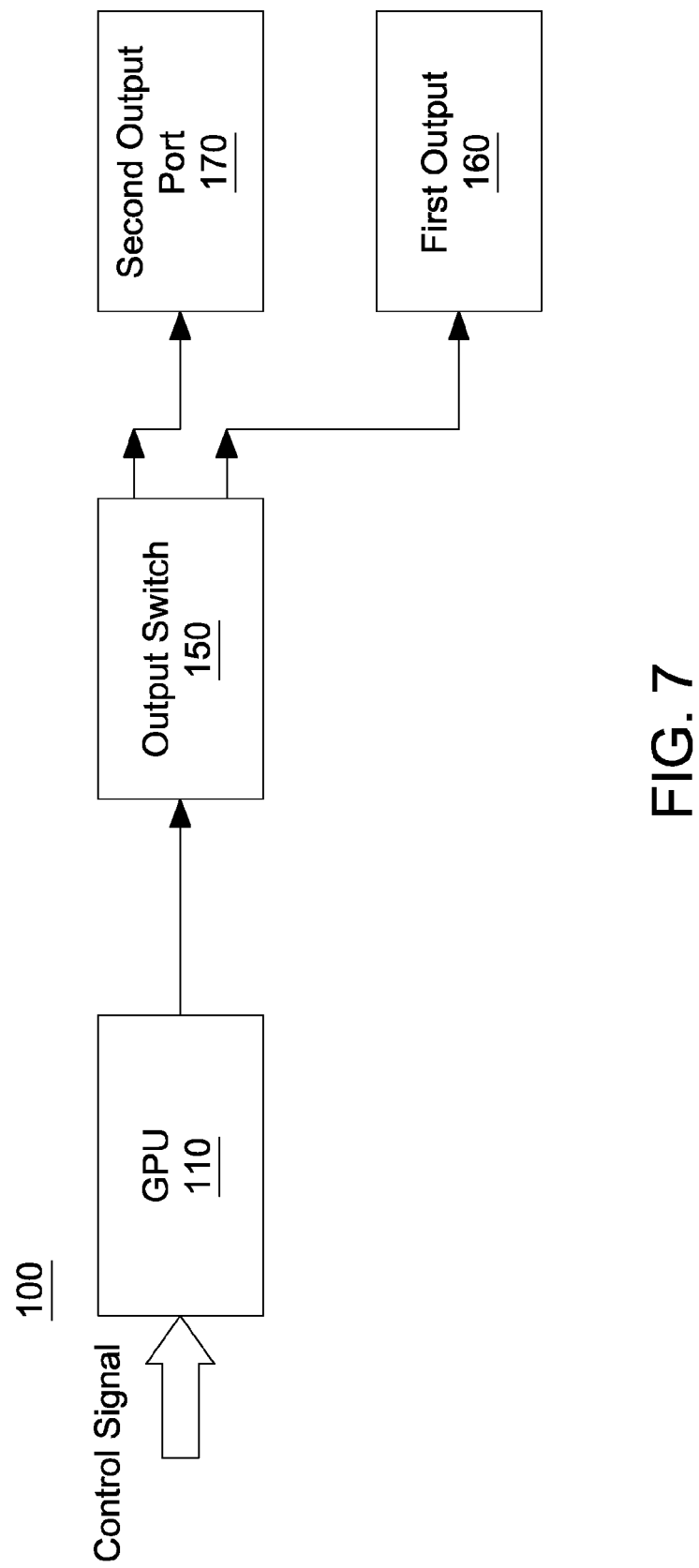
FIG. 7 is a circuit block diagram according to a third embodiment of this disclosure.

FIG. 7 shows a display circuit 100 according to a third embodiment of this disclosure. The display circuit 100 includes a graphics display unit 110 (GPU 110), an output switch 150, a first output port 160, and a second output port 170.

In the third embodiment, the GPU 110 stores a first BIOS program code and a second BIOS program code. The GPU 110 loads either the first BIOS program code or the second BIOS program code to generate the graphics display signal; by loading the first BIOS program code or the second BIOS program code, the GPU 110 determines the specifications of the output graphics display signal and the pins for outputting the graphics display signal corresponding to the first output port 160 or the second output port 170.

Figure 8:
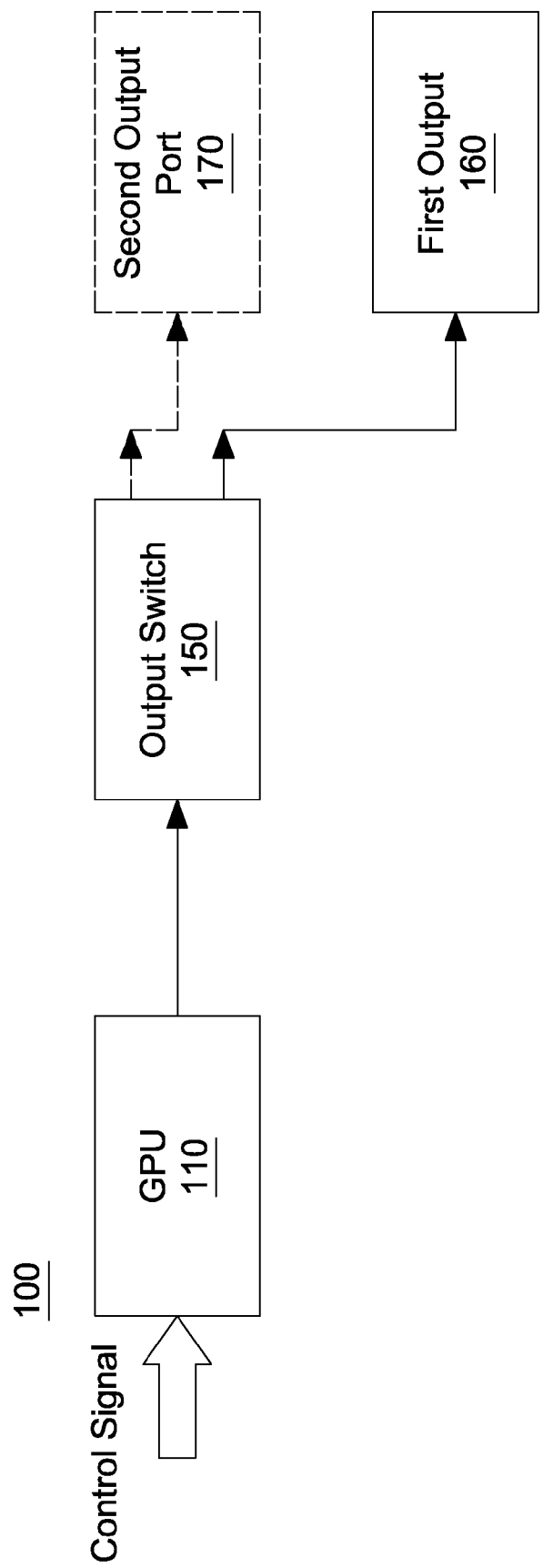
FIG. 8 and FIG. 9 are schematic diagrams according to the third embodiment of this disclosure.

As shown in FIG. 8, when the GPU 110 loads the first BIOS program code, the output switch 150 is switched to electrically connect the first output port 160 to the GPU 110 to receive the graphics display signal conforming to the first output port 160.

Figure 9:
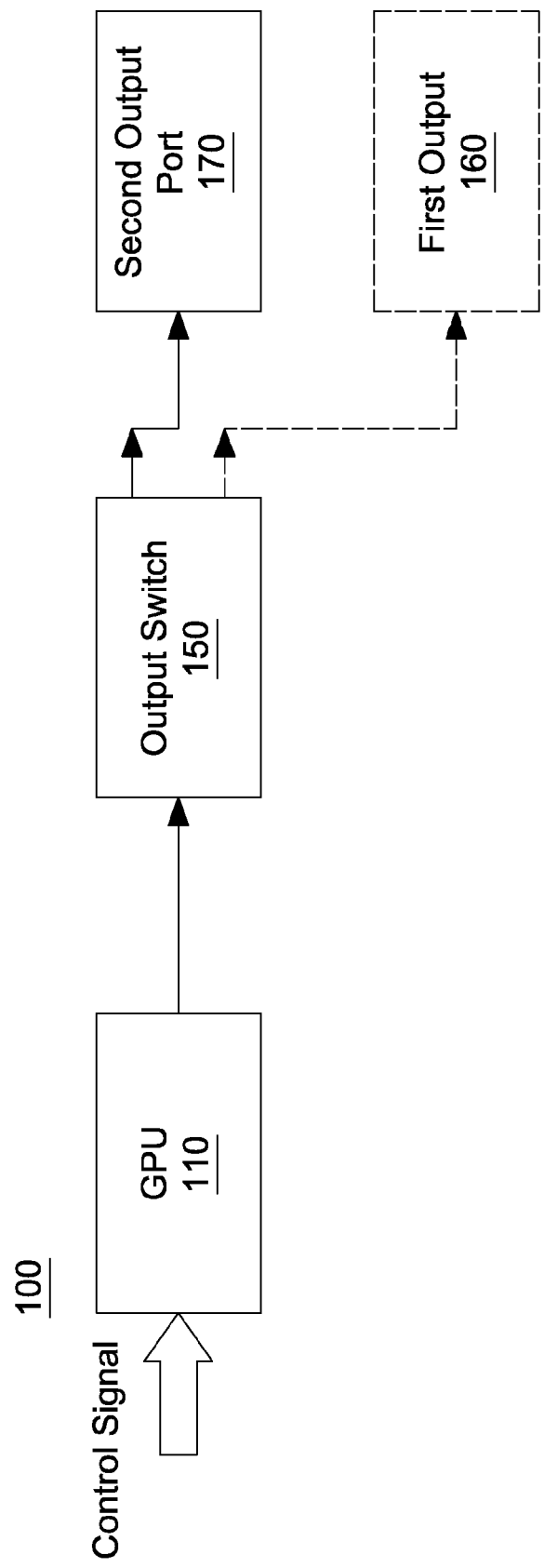

As shown in FIG. 9, when the GPU 110 loads the second BIOS program code, the output switch 150 is switched to electrically connect the second output port 170 to the GPU 110, to receive the graphics display signal conforming to the second output port 170.

Similarly, in the third embodiment, the first output port 160 and the second output port 170 are display signal output port of different specifications. The output switch 150 could be manually switched.

Figure 10:
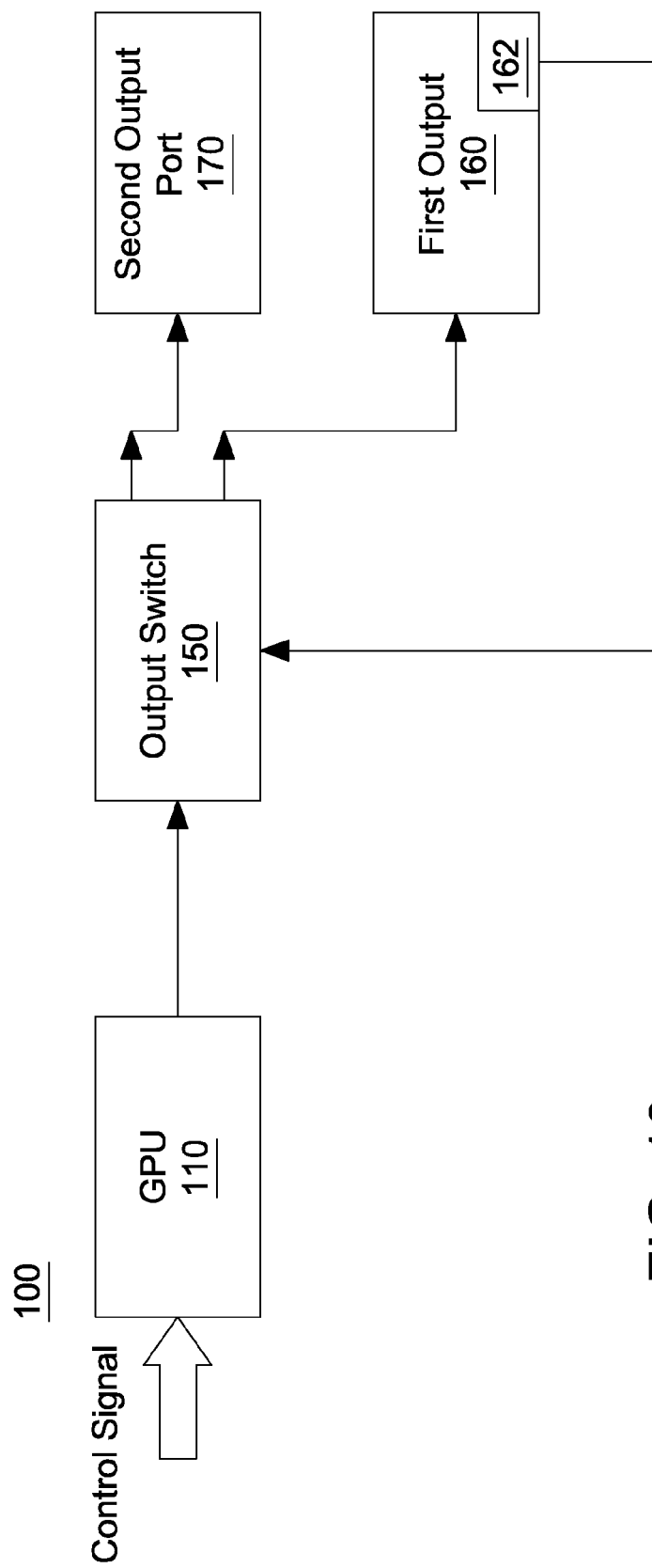
FIG. 10 is a circuit block diagram according to a fourth embodiment of this disclosure.

As shown in FIG. 10, the output switch 150 can be switched automatically. The first output port 160 may include a detection pin 162 electrically connected to the output switch 150 to determine whether the first output port 160 is connected to an external monitor or not.

When the first output port 160 is connected to the external monitor, the detection pin 162 outputs high level (+) as a first switching signal to the output switch 150. The output switch 150 is switched to electrically connect the first output port 160 to the GPU 110. When the second output port 170 is connected to the external monitor, the detection pin 162 outputs a low level (−) as a second switching signal to the output switch 150 (because of the void connection, the detection pin 162 outputs low level). The output switch 150 is switched to electrically connect the second output port 170 to the GPU 110.

Figure 11:
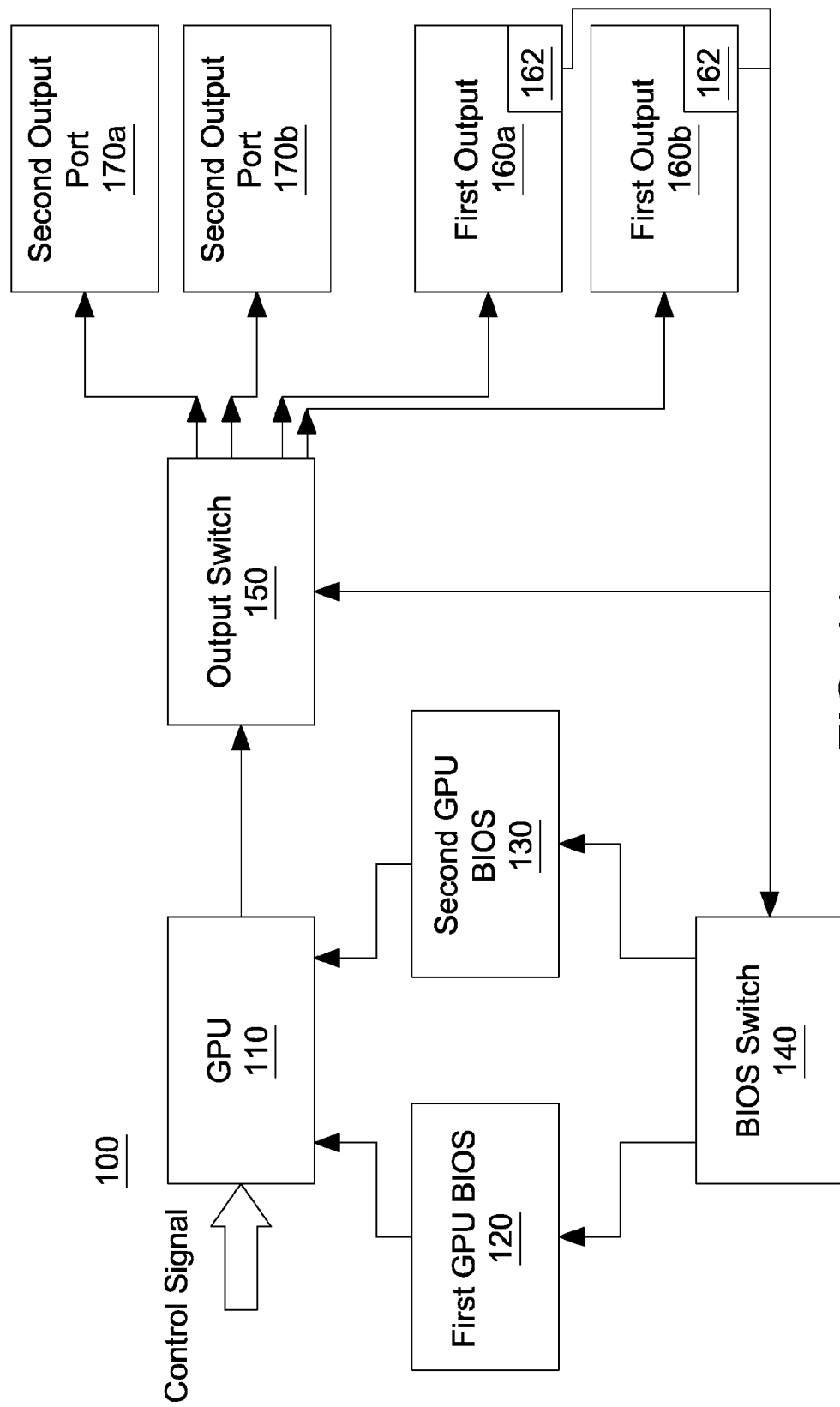
FIG. 11 is a circuit block diagram of a specific implementation aspect of this disclosure.

As shown in FIG. 11, in the first to the third embodiments, the number of the first output port 160 and the second output port 170 is only one, respectively. In fact, the display circuit 100 can includes a first group including plural first output ports 160a, 160b and a second group including plural second output ports 170a, 170b. Each group is composed of two or more output ports. The various output ports of each group could be of different specifications, and constitute distinct specification combinations.

Through the display circuits of this disclosure, the manufacturers can provide diverse display output ports of a variety of specifications. Through the loaded BIOS switching, you can enable the display output ports that the users need, not restricted to the limitation of the number of the output ports caused by one single BIOS. At the same time, through the detection pin of the output port, the aforementioned switching can also become the automatic switching.

What is claimed is:

1. A display circuit of switchable external display ports, comprising:
    a graphics display unit, for generating a graphics display signal;
    a first BIOS, electrically connected to the graphics display unit and storing a first BIOS program code;
    a second BIOS, electrically connected to the graphics display unit and storing a second BIOS program code;
    a BIOS switch, electrically connected to the first BIOS and the second BIOS, for enabling one of the first BIOS and the second BIOS and disabling the other, such that the graphics display unit loads only one of the first BIOS program code and the second BIOS program code;
    an output switch, electrically connected to the graphics display unit;
    at least one first output port ,electrically connected to the output switch; and
    at least one second output port, electrically connected to the output switch;
    wherein the display circuit is arranged such that when the graphics display unit loads the first BIOS program code, the graphics display unit generates the graphics display signal conforming with the first output port, and the output switch is switched to electrically connect the first output port to the graphics display unit to receive the graphics display signal conforming to the first output port; when the graphics display unit loads the second BIOS program code, then the graphics display unit generates the graphics display signal conforming with the second output port, and the output switch is switched to electrically connect the second output port to the graphics display unit to receive the graphics display signal conforming to the second output port;
    wherein the first output port further includes a detection pin electrically connected to the BIOS switch and the output switch to determine whether the first output port is connected to an external monitor or not, wherein:
    when the first output port is connected to the external monitor, the detection pin outputs a first switching signal to the BIOS switch and the output switch, and the BIOS switch is switched to enable the first BIOS and simultaneously the output switch is switched to electrically connect the first output port to the graphics display unit;
    when the second output port is connected to the external monitor, the detection pin outputs a second switching signal to the BIOS switch and the output switch, and the BIOS switch is switched to enable the second BIOS and simultaneously the output switch is switched to electrically connect the second output port to the graphics display unit.

2. The display circuit of switchable external display ports of claim 1, wherein the first output port and the second output port are the display signal output port of different specifications.

3. The display circuit of switchable external display ports of claim 1, wherein the BIOS switch and the output switch are switched manually.

4. The display circuit of switchable external display ports of claim 1, wherein the display circuit of switchable external display ports comprises a plurality of first output ports and a plurality of second output ports; when the graphics display unit loads the first BIOS program code, the graphics display unit generates a plurality of graphics display signals conforming with the plurality of first output ports, and the output switch is switched to electrically connect the plurality of first output ports to the graphics display unit to receive the plurality graphics display signals conforming to the plurality of first output ports; when the graphic display unit loads the second BIOS program code, the graphic display unit generates a plurality of graphic display signals conforming to the plurality of second output ports, and the output switch is switched to electrically connect the plurality of second output ports to the graphic display unit to receive the plurality of graphic display signals conforming to the plurality of second output ports.

5. A display circuit of switchable external display ports, comprising:
 a graphics display unit, storing a first BIOS program code and a second BIOS program code, and loading one of the first BIOS program code and the second BIOS program code for generating a graphics display signal;
 an output switch, electrically connected to the graphics display unit;
 at least one first output port, electrically connected the output switch; and
 at least one second output port, electrically connected to the output switch;
 wherein the display circuit is arranged such that when the graphics display unit loads the first BIOS program code, the graphics display unit generates the graphics display signal conforming to the first output port, and the output switch is switched to electrically connect the first output port to the graphics display unit to receive the graphics display signal conforming to the first output port; when the graphics display unit loads the second BIOS program code, the graphics display unit generates the graphics display signal conforming to the second output port, and the output switch is switched to electrically connect the second output port to the graphics display unit to receive the graphics display signal conforming to the second output port;
 wherein the first output port may include a detection pin electrically connected to the output switch to determine whether the first output port is connected to an external monitor, wherein:
  when the first output port is connected to the external monitor, the detection pin outputs a first switching signal to the output switch, and the output switch is switched to electrically connect the first output port to the graphics display unit;
  when the second output port is connected to the external monitor, the detection pin outputs the second switching signal to the output switch, and the output switch is switched to electrically connect the second output port to the graphics display unit.

6. The display circuit of switchable external display ports of claim 5, wherein the first output port and the second output port are the display signal output ports of different specifications.

7. The display circuit of switchable external display ports of claim 5, wherein the output switch is switched manually.

8. The display circuit of switchable external display ports of claim 1, wherein the display circuit of switchable external display ports comprises a plurality of first output ports and a plurality of second output ports; when the graphics display unit loads the first BIOS program code, the graphics display unit generates a plurality of graphics display signals conforming with the plurality of first output ports, and the output switch is switched to electrically connect the plurality of first output ports to the graphics display unit to receive the plurality graphics display signals conforming to the plurality of first output ports; when the graphic display unit loads the second BIOS program code, the graphic display unit generates a plurality of graphic display signals conforming to the plurality of second output ports, and the output switch is switched to electrically connect the plurality of second output ports to the graphic display unit to receive the plurality of graphic display signals conforming to the plurality of second output ports.

\* \* \* \* \*